(12) United States Patent
Mizukoshi et al.

(10) Patent No.: US 9,347,474 B2
(45) Date of Patent: May 24, 2016

(54) CLIP

(71) Applicants: NEWFREY LLC, Newark, DE (US); HONDA GIKEN KOGYO CO., LTD., Wako-shi, Saitama (JP)

(72) Inventors: Suguru Mizukoshi, Utsunomiya (JP); Mii Miyazaki, Wako (JP); Toshiya Ohba, Wako (JP)

(73) Assignees: NEWFREY LLC, New Britain, CT (US); HONDA GIKEN KOGYO CO, LTD, Saitama (JP)

( * ) Notice: Subject to any disclaimer, the term of this patent is extended or adjusted under 35 U.S.C. 154(b) by 231 days.

(21) Appl. No.: 14/039,489

(22) Filed: Sep. 27, 2013

(65) Prior Publication Data

US 2014/0093325 A1    Apr. 3, 2014

(30) Foreign Application Priority Data

Sep. 28, 2012   (JP) .................................. 2012-216189

(51) Int. Cl.
| | |
|---|---|
| *F16B 13/06* | (2006.01) |
| *F16B 19/10* | (2006.01) |
| *F16B 5/06* | (2006.01) |
| *F16B 21/07* | (2006.01) |

(52) U.S. Cl.
CPC ........... *F16B 13/063* (2013.01); *F16B 19/1081* (2013.01); *F16B 5/065* (2013.01); *F16B 5/0657* (2013.01); *F16B 21/075* (2013.01)

(58) Field of Classification Search
CPC ...... F16B 5/065; F16B 5/0657; F16B 13/063; F16B 19/1081; F16B 21/075; F16B 13/06
USPC ................................ 411/45, 46–48, 508–509
See application file for complete search history.

(56) References Cited

U.S. PATENT DOCUMENTS

| | | | | |
|---|---|---|---|---|
| 4,405,272 A | * | 9/1983 | Wollar ................ | F16B 19/1081 411/41 |
| 4,927,287 A | * | 5/1990 | Ohkawa ................ | F16B 21/086 24/297 |
| 5,211,519 A | * | 5/1993 | Saito .................... | F16B 19/1081 411/45 |
| 5,375,954 A | * | 12/1994 | Eguchi ................ | F16B 19/1081 411/41 |
| 5,387,065 A | * | 2/1995 | Sullivan .............. | F16B 19/1081 411/45 |
| 5,540,528 A | * | 7/1996 | Schmidt .............. | F16B 19/1081 24/297 |
| 5,562,375 A | * | 10/1996 | Jackson .............. | F16B 19/1081 411/48 |

(Continued)

FOREIGN PATENT DOCUMENTS

| | | | |
|---|---|---|---|
| CN | 101683837 B | | 12/2014 |
| JP | 3035307 U1 | | 4/1991 |

(Continued)

*Primary Examiner* — Roberta Delisle
(74) *Attorney, Agent, or Firm* — Michael P. Leary

(57) ABSTRACT

A clip for attaching a mounting component to a base component, and the clip comprises: a pin including a head portion for engaging the mounting component, and a shaft portion which is contiguous to the head portion, and a lock pins which extends downward from the head portion; and a grommet including a flange and a shank contiguous to the flange and partially defining an aperture operable to receive the pin in one of a temporary fitted position and a permanent fitted position; and wherein the temporary fitted position, the lock pin abuts a recessed portion in the grommet for maintaining the temporary fitted position, and wherein in the permanent fitted position, the lock pin collapses on the inside, and is contained on the inside of the shank portion of the grommet.

10 Claims, 12 Drawing Sheets

(56) References Cited

U.S. PATENT DOCUMENTS

| | | | | |
|---|---|---|---|---|
| 5,641,255 A | * | 6/1997 | Tanaka | F16B 19/1081 411/45 |
| 5,775,860 A | * | 7/1998 | Meyer | F16B 19/1081 411/41 |
| 6,533,515 B2 | * | 3/2003 | Meyer | F16B 19/1081 24/453 |
| 6,769,849 B2 | * | 8/2004 | Yoneoka | F16B 5/0642 411/41 |
| 6,874,983 B2 | * | 4/2005 | Moerke | F16B 19/1081 24/297 |
| 6,910,840 B2 | * | 6/2005 | Anscher | F16B 19/1081 411/41 |
| 6,932,552 B2 | * | 8/2005 | Anscher | F16B 19/1081 24/297 |
| 7,222,398 B2 | * | 5/2007 | Koike | B62D 27/02 24/297 |
| 7,249,922 B2 | | 7/2007 | Yoneoka | |
| 8,695,177 B2 | | 4/2014 | Kato et al. | |
| 2005/0019130 A1 | * | 1/2005 | Kanie | F16B 19/1081 411/45 |
| 2008/0240882 A1 | * | 10/2008 | Schwarzkopf | F16B 19/1081 411/46 |
| 2008/0298925 A1 | * | 12/2008 | Shinozaki | F16B 19/1081 411/48 |

FOREIGN PATENT DOCUMENTS

| | | |
|---|---|---|
| JP | 4124315 U1 | 11/1992 |
| JP | 8001090 U1 | 7/1996 |

* cited by examiner

CLIP

CROSS-REFERENCE TO RELATED APPLICATIONS

This application claims priority from Japanese Patent Application No. 2012-216189, filed on Sep. 28, 2013, the disclosure of which is incorporated herein by reference.

BACKGROUND OF THE INVENTION

The present invention pertains to a clip used for attaching a mounting component such as a spoiler or molding or the like to a base component such as a panel for a car or the like. More particularly, it pertains to a clip comprised of two parts, a pin and a grommet.

In general, a clip is used to attach a mounting component such as a spoiler or molding or the like to a base component such as a panel of a car or the like. Many of these sorts of clips have been offered in the past. An item is often used which is made from a combination of a pin and grommet, in which a pin is pressed into an aperture of the shank of the grommet, and the diameter of a locking hook placed in the shank is expanded, which locks in the attaching aperture of the base component (panel.)

Japanese published unexamined Utility Model Application 8-1090 (JP 8-1090 UM) discloses a clip comprised of this sort of male component (pin) and female component (grommet). The male component has a head portion, and a shaft portion which extends from the lower surface of the head portion, and has a bulging engaging portion at its tip. A rim portion used for sealing is formed on the periphery of the top of the shaft; at the bottom side of the head portion; and the female component has a shank portion, an attaching flange, which, being formed on the circumference of the upper end of the shank portion, regulates the amount of insertion of the shank portion, and a slit which, being formed on the circumference of the lower end of the shank portion, permits elastic deformation at the aperture portion on the bottom side. The rim portion for sealing is given an umbrella-shape with a size that covers the entire flange from the outside.

In the clip of JP 8-1090 UM, the shank portion is easily inserted in the aperture portion of the mounting component by means of a bending deformation towards the inside of the shank portion, and the male component inserts the shaft portion from the upper end side opening of the female component, and the bulging engaging portion projects from the lower end side opening and locks so as to prevent slipping. For that reason, attaching to the panel is simple, and there is good operability. The rim portion for sealing presses onto the upper surface of the other panel and, and the seal is maintained.

In the clip of JP 8-1090 UM, the male component is attached to one panel in advance, the female component is attached to the other panel, and the panel parts are joined by inserting the male component of the clip into the female component. It cannot be used by connecting the male component and the female component in a temporary fitted state and then attaching the pair to a panel for a permanent fitted state.

In Japanese published unexamined Utility Model Application 3-35307 (JP 3-35307 UM), a clip is disclosed for attaching a part comprised of a main body (pin) made of a resin material that has a head portion and a shaft portion which extends from the head portion and a bushing (grommet) which is fitted on the tip of the shaft portion of the main body. The bushing is formed from a soft resin material. A projecting portion is formed on the shaft of the main body, which projects outward in the radial direction. The four divided leg portions of the shaft have a shape which projects in the radial direction, facing outwards.

The bushing of the clip for attaching two parts in JP 3-35307 UM is formed from a resin material which has the characteristic of not melting with the resin of the main body, and the main body is manufactured by the injection molding of a fused resin; it is possible to form it on the shaft of the main body by injection molding of a fused resin. Thus, it is possible to obtain a clip in which a bushing is attached to the shaft of the main body.

The bushing is inserted in the attaching aperture of a panel, and if the shaft of the main body is inserted inside the bushing, the leg portion of the shaft is bent to the inside in the radial direction and the projecting portion passes through the attaching aperture; being positioned at the back of the panel, the leg portion of the shaft portion projects outside in the radial direction, and the projecting portion deforms the bushing in the radial direction facing outwards; the projecting portion engages at the rim of the aperture of the panel, and the clip engages with the panel.

In the clip for attaching parts in JP 3-35307 UM, a protuberance formed on the inner surface of a bushing engages in an annular groove of the tip of the shaft portion, and it becomes possible to prevent the bushing from dropping off during transport or attaching. However, the bushing being made from a soft resin material, the engaging between the bushing and the main body is weak, and there is a concern that it may slip. Also, since the bushing is made of soft resin material and is deformed when it is joined to the panel, because it is possible for the leg portion of the main body to bend in the radial direction facing inward, there is a concern that it may drop off from the panel by means of an external force, even though it is in a state in which it is attached to the panel.

Japanese published unexamined Utility Model Application 4-124315 (JP 4-124315 UM) discloses a synthetic resin clasp comprised of tubular locking legs which are suspended vertically from the lower surface of the rim portion, with expandable locking hooks around its circumferential surface, and a pin which passes through the insertion aperture formed on the rim portion and inserted in a vacant portion of the locking legs, and expands the locking hooks. A soft, pliable tubular cap made from soft synthetic resin is mounted on the locking legs by being tightly attached to them, and the outer surface of the locking legs being covered, direct engaging of the locking legs with the rim of the panel aperture is avoided. Thus, the coating which is coated onto the panel is contacted lightly, so that the coating is not harmed.

In the clasp of JP 4-124315 UM, if the shaft of the pin is inserted in the vacant portion of the main body of the clasp before use, a first enlarged-diameter portion pushes a protuberance to the outside; by means of the protuberance, the rim of the first enlarged-diameter portion is received, preventing it from being pulled out. When the clasp is attached to a car body, if the pin is pressed on the main body of the clasp, a second enlarged-diameter portion moves to push a protuberance, and a step portion on the second enlarged-diameter portion engages with a protuberance of the main body of the clasp preventing motion in the direction of it being pulled out. In the clasp of JP 4-124315 UM, when the protuberance of the main body of the clasp rides over the first enlarged-diameter portion or the second enlarged-diameter portion of the pin, because the diameter of the entirety is enlarged, the inserting force is large; and when it is attached on the car body, the entirety of the main body of the clasp is bent and deformed. For this reason, there is a concern that the main body of the clasp deteriorates in quality.

For this reason, a clip has been sought which can simply and securely attach a mounting component such as a spoiler or molding or the like to a base component such as a car panel or the like. A clip has been sought in which when the clip is maintained in a temporary fixed state, for example during transport, so that the two parts are not fitted by mistake. Also, a clip has been sought in which when permanently fitted from the temporary fitted state, there is the appropriate manual sensation, and it is easy to understand that a permanent fitting has been completed.

SUMMARY OF THE INVENTION

Accordingly, the object of the present invention is to offer a clip which can simply and securely attach a mounting component such as a spoiler or molding or the like to a base component such as a car panel or the like. Another object of the present invention is to offer a clip in which there is no easy permanent fitting other than when the clip is attached to the base component. Another object of the present invention is to offer a clip in which it is easy to confirm that the clip has been permanently fitted.

In order to accomplish these tasks, in a first embodiment of the present invention for attaching a mounting component to a base component, the clip is characterized by being provided with a pin and a grommet with an aperture portion for inserting the pin, said pin having a head portion which holds the mounting component, a shaft portion which is contiguous with the head portion, and a pair of lock pins extending downwards from the head portion; and by said grommet having a flange and a shank which is contiguous with the flange; and in the temporary fitted state, the lock pins of the pin abut a recessed portion formed in the grommet, maintaining the temporary fitted state; and in the permanent fitted state, the lock pins collapse into the inside, and are contained in the inside of the shank portion of the grommet.

By means of the structure mentioned above, in the temporary fitted state, because the lock pins of the pin abut a recessed portion formed in the grommet, there is no permanent fitting of the pin and the grommet other than when attaching to the base component.

It is desirable that an enlarged portion is formed on the tip of the lock pins, so that when the enlarged portion is pushed to the inside, the abutment of the lock pins with the recessed portions is released. In this way, a permanent fitted state is easily done, when it is intended to do a permanent fitting.

It is desirable to form the pin with a lock pin containing concave area, so that the lock pins which are bent towards the inside are contained in the lock pin containing concave area. In this way, the lock pins do not project in the permanent fitted state, and during insertion, the insertion force increases by means of self-interference; in addition, poor insertion does not occur. Further, because there is the appropriate manual sensation from the temporary fitted state to the permanent fitted state, it is easy to confirm a completed attachment.

It is desirable that the pin have a concave temporary fitting portion on the shaft and the grommet have a convex shank side surface engaging portion on the shank portion; and in the temporary fitted state, the convex shank side surface engaging portion of the grommet engages in the temporary fit concave portion of the pin to prevent slipping.

It is desirable that the pin have a pair of locking hooks in the shaft and the grommet have a pair of inclined surface portions on the shank and a locking hook containing portion below the inclined surface portions, so that during a permanent fitting, the locking hooks pass over the inclined surfaces and are positioned in the locking hook containing portion to prevent slipping. In this way, the pin and the grommet do not easily slip from the permanent fitted state. Also, it is easy to confirm that the clip has been completely fitted, by means of a click sensation.

In a second embodiment of the present invention for attaching a mounting component to a base component, being a clip which is provided with a pin and a grommet having an aperture for inserting a pin, the clip is characterized in that the pin has a head for holding the mounting component, a shaft which is contiguous with the head portion, and a pair of lock bars which are contiguous with the head portion; the grommet has a flange, a shank portion contiguous with the flange, and a pair of lock pins formed in the shank portion; and in the temporary fitted state, the lock pins of the grommet about the lock bars which are formed in the pin, maintaining the temporary fitted state; and in the permanent fitted state, the lock pins collapse in the inside and are contained in the inside of the lock bars of the pin.

It is desirable that an enlarged portion be formed on the tip of the lock pins, so that when the enlarged portion is pushed to the inside, the abutment of the lock pins towards the lock bars is released.

It is desirable that a lock pin containing concave area be formed in the pin, and the lock pins which are bent towards the inside be contained in the lock pin containing concave area.

It is desirable that the pin have an enlarged shaft portion on the shaft and the grommet have a pair of inclined surfaces on the shank, and a locking hook containing portion below the inclined surfaces; and in the temporary fitted state, the enlarged portion passes over the inclined surfaces and is positioned in the locking hook containing portion of the lower portion to prevent slipping.

It is desirable that the pin have a pair of locking hooks, and in the permanent fitted state, the locking hooks pass over the inclined surfaces and are positioned in the locking hook containing portion and prevent slipping.

By means of the present invention, it is possible to obtain a clip which can easily and securely attach a mounting component such as a spoiler or molding or the like to a base component such as a car panel or the like. It is also possible, by means of the present invention, to obtain a clip in which there is no permanent fitting other than when the clip is attached to the base component. Further, by means of the present invention, it is possible to obtain a clip in which it can be easily confirmed that a permanent fitting has been done.

DETAILED DESCRIPTION OF THE PREFERRED EMBODIMENTS

Figure 22:
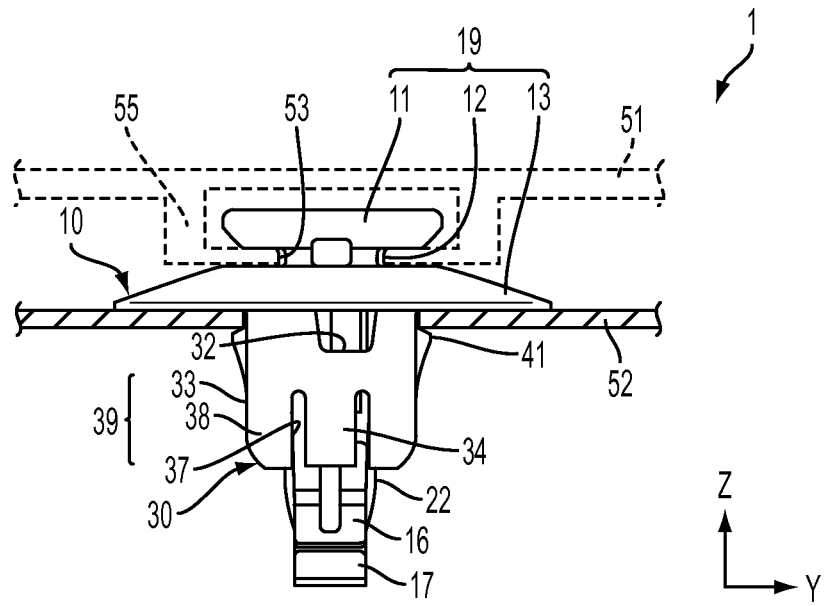
FIG. 22 is a side elevation view showing the appearance of the clip of the first embodiment of the present invention attached to a panel, and attaching a spoiler.

In the following, embodiments of the present invention will be explained with reference to the Drawings. Clip 1 according to the first embodiment of the present invention is comprised of a pin 10 made from synthetic resin, shown in FIGS. 1-5, and a grommet 30 made from synthetic resin, shown in FIGS. 6-11. Pin 10 and grommet 30 are maintained in the temporary fitted state shown in FIGS. 12-16. After pin 10 and grommet 30 are attached to a mounting component such as a spoiler or molding or the like in a temporary fitted state, they are inserted into the attaching aperture of a base component such as a body panel of a car or the like, and pin 10 is pushed into grommet 30 resulting in the permanent fitted state shown in FIGS. 17-20. FIG. 22 shows an example of a mounting component such as a spoiler or molding or the like attached to pin 10 of clip 1 in a permanent fitted state attached to a base component such as the body panel of a car or the like.

In this Specification, coordinate axes will be used to explain the configuration of Clip 1; the up-and-down direction of the clip will be called the z direction, the long direction of the roughly rectangular clip as seen from the upper surface (horizontal direction) will be called the x direction, and the direction at a right angle to the x direction and the z direction (widthwise direction) will be called the y direction.

Figure 1:
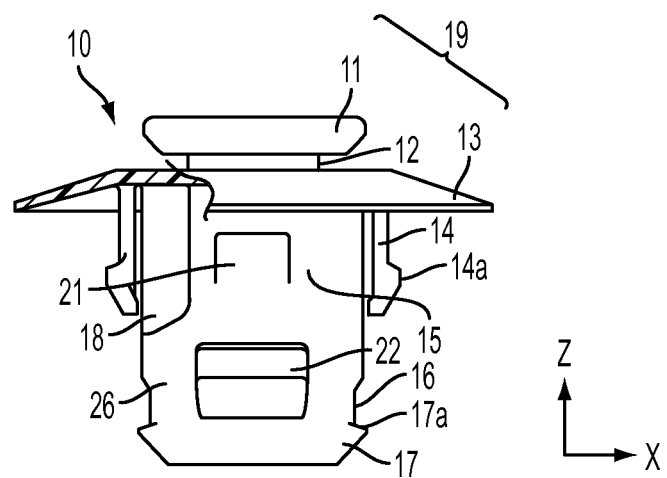
FIG. 1 is a front elevation view of the clip according to the first embodiment of the present invention.
Figure 2:
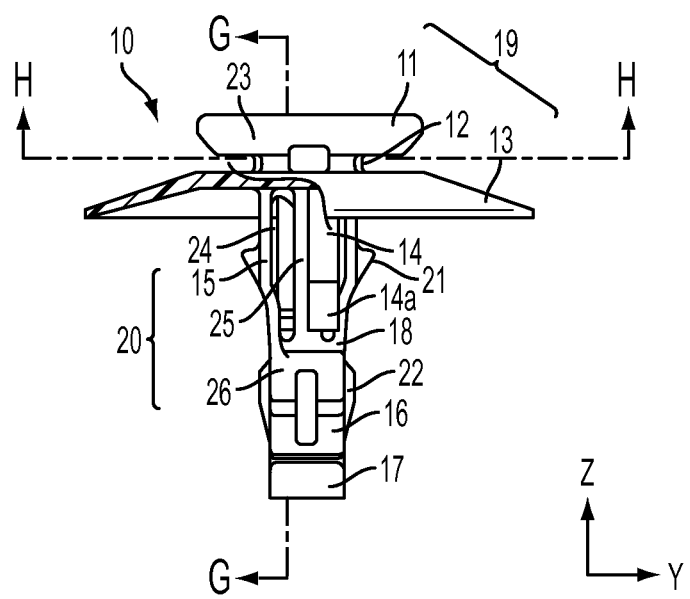
FIG. 2 is a left side elevation view of the pin of FIG. 1.
Figure 3:
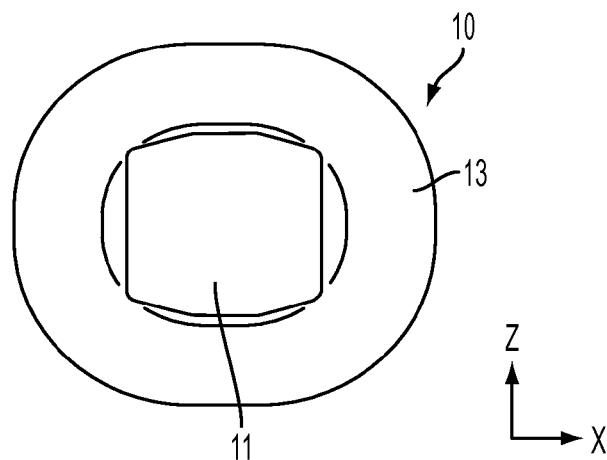
FIG. 3 is a top plan view of the pin of FIG. 1.
Figure 4:
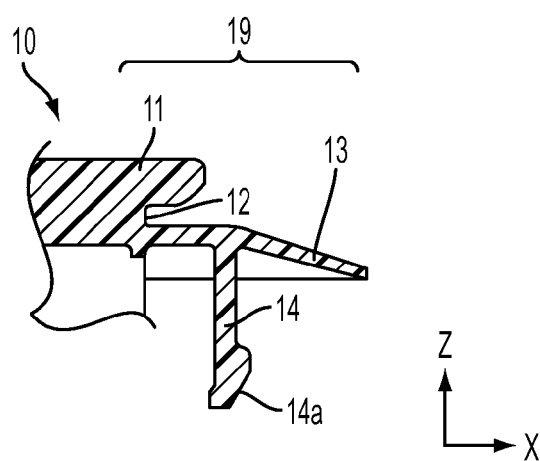
FIG. 4 is a partial cross-section along line G-G of FIG. 2 of the pin of FIG. 1.
Figure 5:
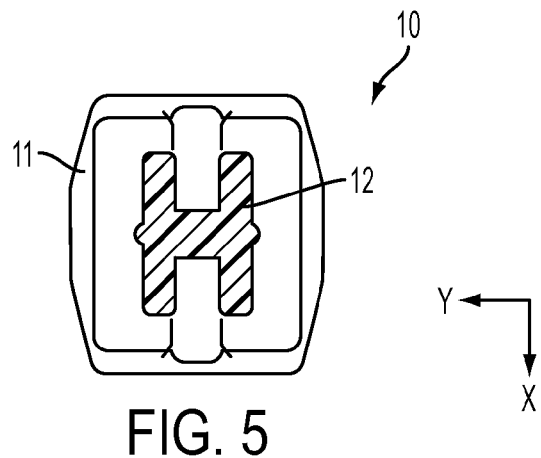
FIG. 5 is a cross-section along line H-H of FIG. 2 of the pin of FIG. 1.

Pin 10 will be explained with reference to FIGS. 1-5. FIG. 1 is a front elevation view of pin 10 of clip 1 according to the first embodiment of the present invention. FIG. 2 is a side elevation view of pin 10 of FIG. 1. FIG. 3 is top plan view. FIG. 4 is a cross-section along line G-G of FIG. 2 of pin 10 of FIG. 1. FIG. 5 is a cross-section along line H-H of FIG. 2 of pin 10 of FIG. 1.

Pin 10 is comprised of a head portion 19, a shaft portion 20, and lock pins 14. Head portion 19 has a pin flange 11, a neck portion 12, and a plate portion 13. The top of head portion 19 has an octagonal pin flange 11, the top surface of which is planar. As shown in FIG. 3, three sides of the octagon which oppose in the y direction have been modified so that the angle is smaller, and the entirety has a shape which approximates a rectangle. Head portion 19 has a short neck portion 12 in the up-and-down direction (z direction) below pin flange 11. As shown in FIG. 5—which is a cross-section along line H-H of FIG. 2 of pin 10—neck portion 12 has smaller dimensions in the x direction and y direction than pin flange 11. In neck portion 12, the dimensions in the x direction are longer than in the y direction. A neck portion aperture 23 is formed in neck portion 12.

Head portion 19 has an umbrella-shaped plate portion 13 below neck portion 12. As shown in FIG. 3, plate portion 13 has longer dimensions than pin flange 11 in the x direction and the y direction and is roughly elliptical, the x direction being longer than the y direction. As shown in FIG. 4 which is a cross-section along line G-G of FIG. 2 of the pin, plate portion 13 has a narrow thickness, and the part near the end portion is inclined downwards; the tip portion has a narrow thickness so that it can be elastically deformed. When clip 1 is attached to the base component, the end portion of plate portion 13 abuts the surface of the base component.

From a position midway in head portion 19 in the extended x direction, a pair of lock pins 14 extend in the x direction, in the downward direction. The tip portion of lock pins 14 is a thick enlarged portion 14a. The tip portions of lock pins 14 abut recessed portions 32 of shank portion 39 of grommet 30 when clip 1 is in a temporary fitted state and acts to maintain it so a permanent fitting is not done. If enlarged portions 14a are pushed so as to mutually approach one another, the abutment of lock pin 14 towards recessed portion 32 slips out, lock pins 14 bend and enter the inside of shank portion 39, so that a permanent fitting becomes possible.

Shaft portion 20 extends downwards below the central portion of head portion 19. Shaft portion 20 has a pair of shaft planar surfaces 15, a shaft central portion 25, and a shaft lower portion 26. Shaft portion 20 has a pair of shaft planar surfaces 15 which are opposed in the y direction. A lock pin containing concave area 18 is formed on shaft planar surface 15 on the inside of locking pin 14 in the x direction. When clip 1 is in the permanent fitted state, lock pins 14 collapse in the inside and are contained in the lock pin containing concave area 18. In shaft portion 20, between the pair of shaft planar surfaces 15 in the central portion in the y direction, a shaft central portion 25 extends in the z direction and maintains the strength of the shaft portion.

As shown in FIGS. 1 and 2, at the central portion in the x direction of shaft planar surface 15 below plate portion 13 a pair of locking hooks 21 are provided which project in the y direction. On the inside of shaft planar surface 15, a vacant shaft portion 24 is formed, which extends in the vertical (z direction) so that locking hook 21 can be elastically deformed in the y direction. When clip 1 does a permanent fitting, locking hook 21 engages with step portion 45 of grommet 30 and acts to hold it so that pin 10 and grommet 30 do not slip.

Shaft portion 20 has a shaft lower portion 26 below the shaft planar surface 15 and the shaft central portion 25. A pair of enlarged shaft portions 22 is provided on the shaft lower portion 26 which project in the y direction. The upper end portion and the lower end portion of enlarged shaft portion 22 are inclined surfaces.

The end portion in the horizontal direction (x direction) of shaft lower portion 26 is the temporary fitting concave portion 16 which is concave in the x direction, and an engaging end portion 17 which projects in the x direction is below temporary fitting concave portion 16. The boundary between temporary fitting concave portion 16 and engaging end portion 17 is engaging step portion 17a. When clip 1 is in a temporary fitted state, engaging step portion 17a engages in shank side surface convex engaging portion 35 of grommet 30, holding the temporary fitted state of pin 10 and grommet 30.

Figure 6:
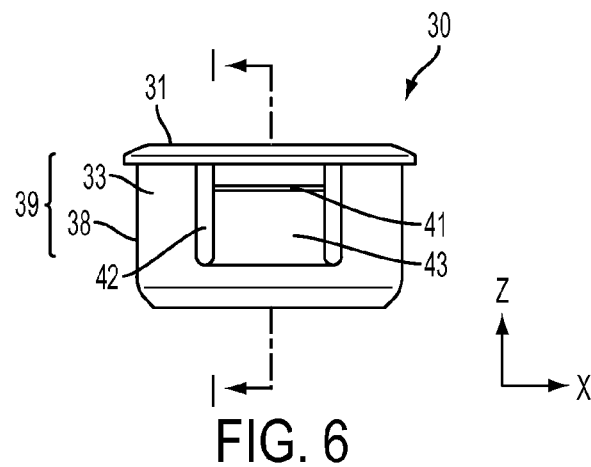
FIG. 6 is a front elevation view of the grommet of the clip according to the first embodiment of the present invention.
Figure 7:
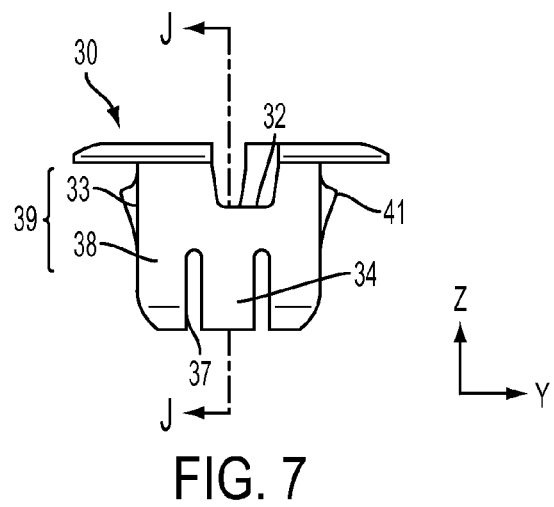
FIG. 7 is a right side elevation view of the grommet of FIG. 6.
Figure 8:
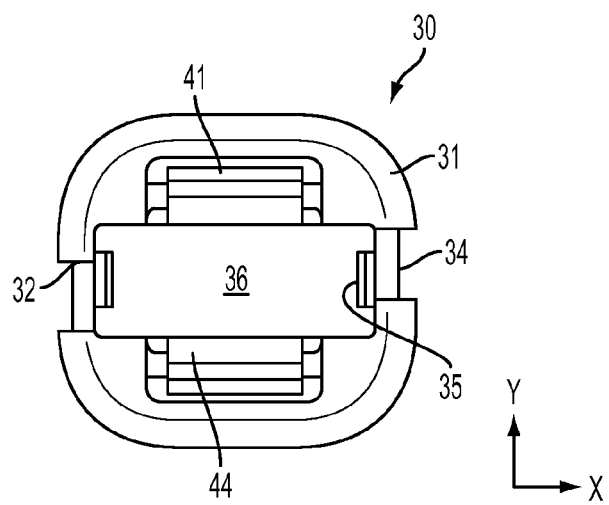
FIG. 8 is a top plan view of the grommet of FIG. 6.
Figure 9:
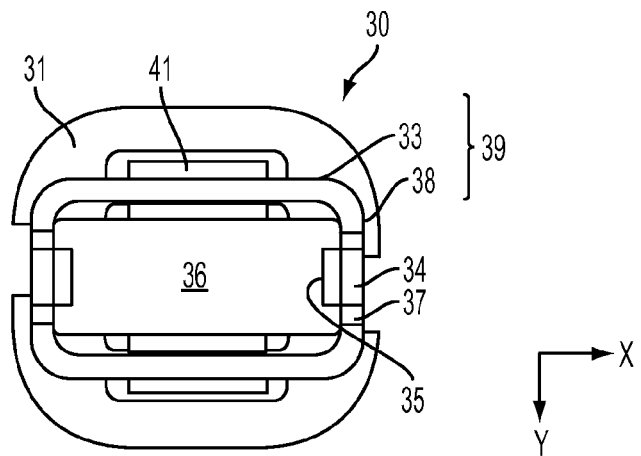
FIG. 9 is a bottom plan view of the grommet of FIG. 6.
Figure 10:
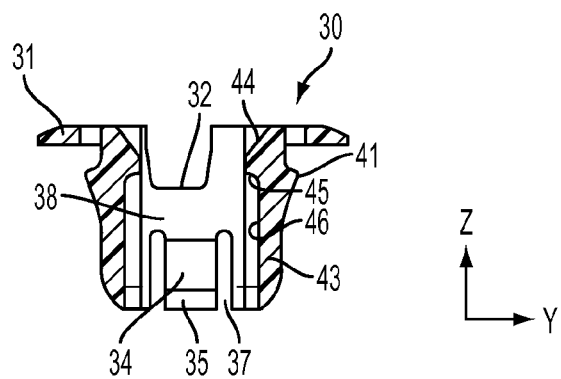
FIG. 10 is a cross-section along line I-I of FIG. 6 of the grommet of FIG. 6.
Figure 11:
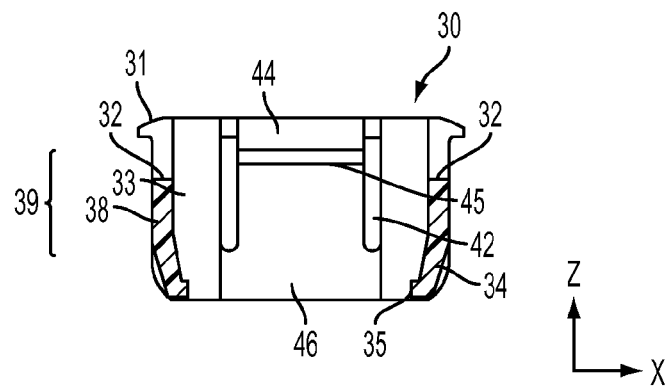
FIG. 11 is a cross-section along line J-J of FIG. 7 of the grommet of FIG. 6.

Grommet 30 will be explained with reference to FIGS. 6-11. FIG. 6 is a front elevation view of grommet 30 of clip 1 according to the first embodiment of the present invention. FIG. 7 is a side elevation of grommet 30, FIG. 8 is a top plan view, and FIG. 9 is a bottom plan view. FIG. 10 is a cross-section along line I-I of FIG. 6 of grommet 30. FIG. 11 is a cross-section along line J-J of FIG. 7 of grommet 30.

As shown in FIG. 8, grommet 30 has an oval flange 31, the corners on the upper end portion being arc-shaped and the opposing sides being straight. An aperture is made in the central portion of flange 31, so that the shaft portion 20 of pin 10 can be inserted. Below flange 31 there are the xz planar surfaces which are the shank planar surfaces 33 and the yz planar surfaces, which are the shank planar surfaces 38, which form the shank portion 39. An aperture 36 is placed in shank portion 39 for inserting the shaft portion 20 of pin 10. Concave recessed portions 32 are placed on both ends of flange 31 in the x direction and on the top portion of shank side surface portion 38. During the temporary fitted state, lock pins 14 of pin 10 engage at the recessed portions 32, so as to maintain the temporary fitted state.

A pair of shank planar engaging walls 43 is placed below the shank planar surfaces 33 of the central portion of flange 31, which is the surface (xz surface) which extends in the horizontal direction of shank portion 39. The thickness of the shank planar engaging wall 43 becomes thicker towards the top, and its upper end portion is a pair of shank planar surface convex engaging portions 41. Slits 42 are made on both ends of shank planar engaging walls 43 in the x direction and on the upper end portion in the z direction, so that shank planar engaging wall 43 is elastically deformable. Planar surface convex engaging portions 41, when engaging in the attaching aperture 54 of base component 52, elastically deform and the gap becomes narrow; and after passing through attaching aperture 54, the gap returns to its original state, and they abut the lower surface around the attaching aperture 54 of mounting component 52.

On the top portion of shank planar surface engaging wall 43, the inside of flange 31 in the y direction becomes the inclined surfaces 44. In the temporary fitted state, locking hook 21 of pin 10 is positioned so as to not abut the top portion of inclined surface 44. The bottom of inclined surface 44 is a step portion 45, and the dimensions of step portion 45 to aperture 36 in the y direction grow larger, and become the locking hook containing portion 46. If pin 10 is pushed into the aperture portion of grommet 30, the locking hook 21 of pin 10 abuts inclined surface 44, and elastically deforms at the inside in the y direction and moves downward. In the permanent fitted state, locking hook 21 engages with step 45 and prevents slipping.

As shown in FIG. 11, which is a cross-section along line J-J of the grommet in FIG. 7, on the bottom side of recessed portion 32 on the end portion of grommet 30 in the x direction, there is a pair of shank side surfaces 38. In a temporary fitted state, lock pin 14 of pin 10 enters at recessed portion 32, and the tip portion of lock pin 14 abuts the upper end portion of shank side surface 38 (the bottom portion of recessed portion 32) and it being impossible for pin 10 to be pushed into grommet 30 any further, the temporary fitted state is maintained. A shank side surface engaging portion 34 is formed on the bottom of the central portion of shank side surface 38, and a convex portion is formed on the tip of shank side surface engaging portion 34, which becomes shank side surface convex engaging portion 35. During the temporary fitted state, shank side surface convex engaging portion 35 engages in temporary fitting concave portion 16 of pin 10, so as to maintain the temporary fitted state.

As shown in FIG. 10, which is a cross-section along line I-I of FIG. 6 of grommet 30, a slit 37 is made on both end portions of shank side surface engaging portion 34 in the y direction, and shank side surface engaging portion 34 becomes elastically deformable in the x direction.

Figure 12:
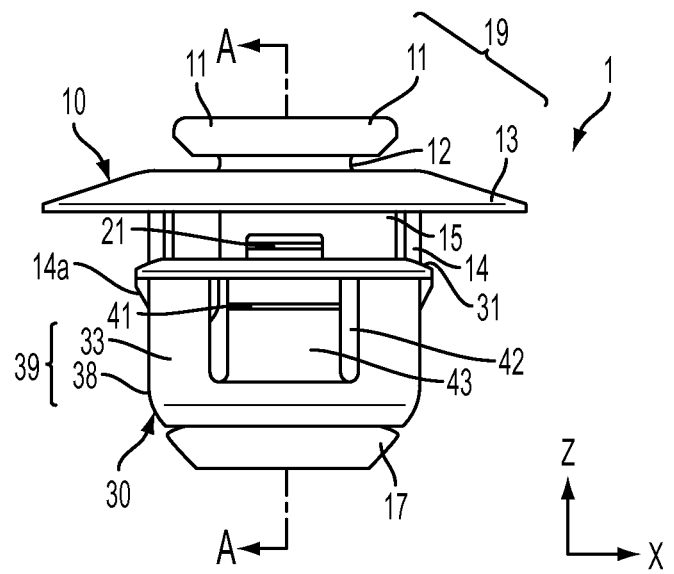
FIG. 12 is a front elevation view showing the appearance of the clip temporarily fitted, with the pin of FIG. 1 and the grommet of FIG. 6.
Figure 13:
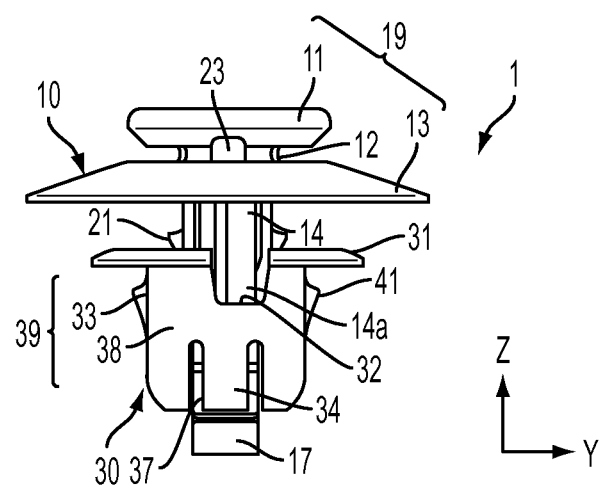
FIG. 13 is a side elevation view of the clip of FIG. 12.
Figure 14:
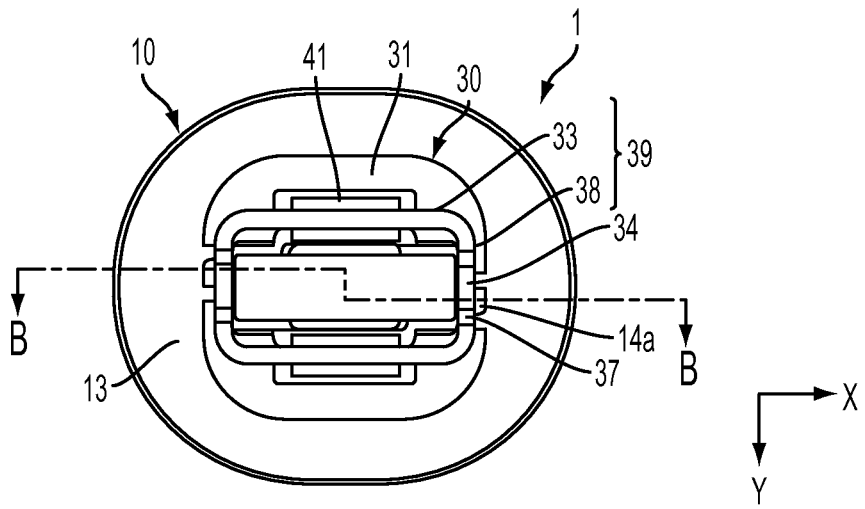
FIG. 14 is a bottom plan view of the clip of FIG. 12.
Figure 16:
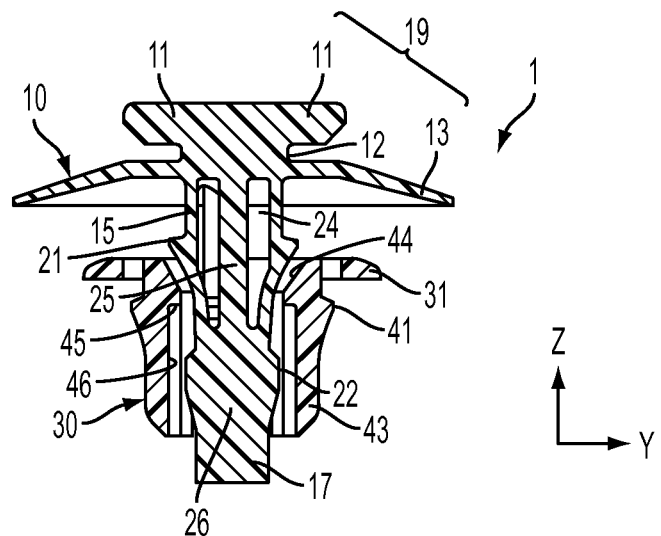
FIG. 16 is a cross-section along line A-A of FIG. 12 of the clip of FIG. 12.

FIG. 12 is a front elevation view of clip 1 when pin 10 and grommet 30 are in a temporary fitted state. FIG. 13 is a side elevation view of clip 1; and FIG. 14 is a bottom plan view. Figure is a cross-section along line B-B of FIG. 14 of clip 1. FIG. 16 is a cross-section along line A-A of FIG. 12.

When putting pin 10 and grommet 30 into the temporary fitted state, the x and y directions of pin 10 and grommet 30 are matched, and engaging portion 17 of pin 10 is put forward first, and pin 10 is inserted into aperture 36 of the central portion from the side of flange 31 of grommet 30. Engaging portion 17 of pin 10 pushes and widens shank side surface convex engaging portion 35 of the tip portion of the shank side surface engaging portion 34 of grommet 30, and riding over, the space between shank side surface convex engaging portions 35 which oppose in the x direction becomes smaller, and shank side surface convex engaging portion 35 of grommet 30 enters the temporary fitting concave portion 16 of pin 10. At that time, the enlarged portion 14a of the tip portion of lock pins 14 of pin 10 abuts recessed portion 32 of shank side surface portion 38, and pin 10 stops. This state is the temporary fitted state. The distance between the surfaces which oppose in the y direction of shaft enlarged portion 22 of pin 10 is roughly equal to the distance between the lower end portions of the opposing inclined surfaces 44 of grommet 30, and it is possible for shaft enlarged portion 22 to enter the locking hook containing portion 46.

Because shank side surface convex engaging portion 35 of grommet 30 enter into the temporary fitting concave portion 16 of pin 10, pin 10 and grommet 30 are temporarily locked, and as long as no strong extracting force is applied, pin 10 is not pulled out of grommet 30 and does not fall out.

As long as a force is not applied in a direction so that the enlarged portions 14a on the tip portion of a pair of lock pins 14 do not approach one another, lock pins 14 are locked, and pin 10 cannot be inserted further into the aperture of grommet 30, maintaining the temporary fitted state.

Figure 15:
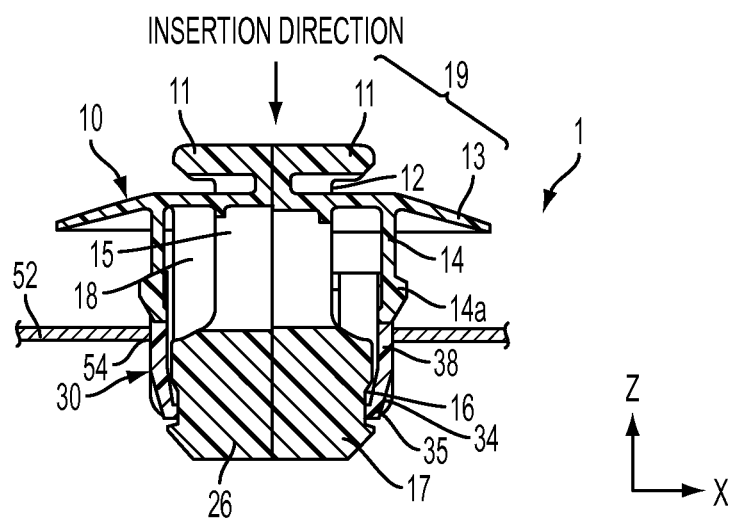
FIG. 15 is a cross-section along line B-B of FIG. 14 of the clip of FIG. 12.

As shown in FIG. 16 which is a cross-section along line A-A of FIG. 12, in the temporary fitted state, there is a space from inclined surface 44 of grommet 30, and locking hook 21 of pin 10 does not abut. As shown in FIG. 15 which is a cross-section along line B-B of FIG. 14, if clip 1 in which pin 10 and grommet 30 have been temporarily fitted is inserted in attaching aperture 54 of base component 52, engaging end portion 17 being put forward first, although shank planar surface 33 and shank planar surface 38 can pass through attaching aperture 54, in the distance in the x direction of the enlarged portion 14a of two lock pins 14, the dimensions in the x direction being larger than the inner diameter of attaching aperture 54, it abuts on the inner rim portion of attaching aperture 54, and clip 1 is stopped.

Figure 17:
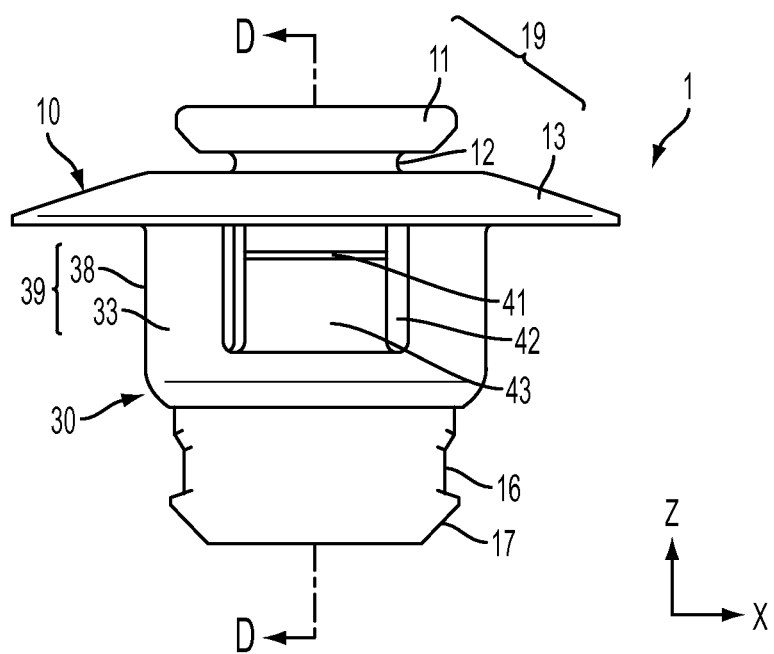
FIG. 17 is a front elevation view showing the appearance of a clip permanently fitted, with the pin of FIG. 1 and the grommet of FIG. 6.
Figure 18:
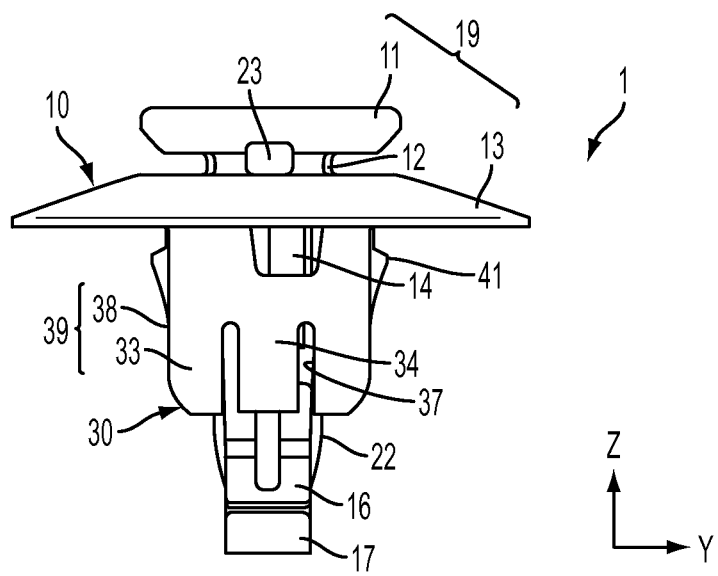
FIG. 18 is a side elevation view of the clip of FIG. 17.
Figure 19:
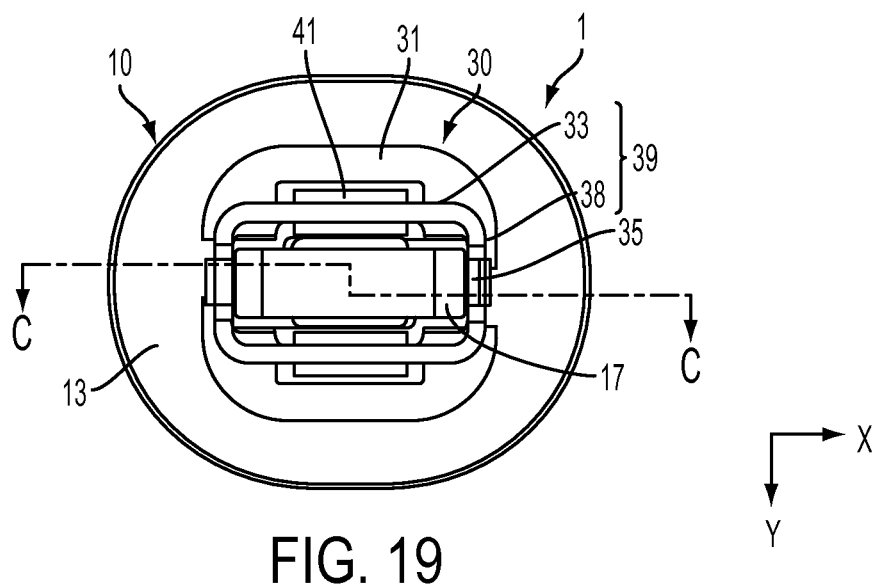
FIG. 19 is a bottom plan view of the clip of FIG. 17.
Figure 20:
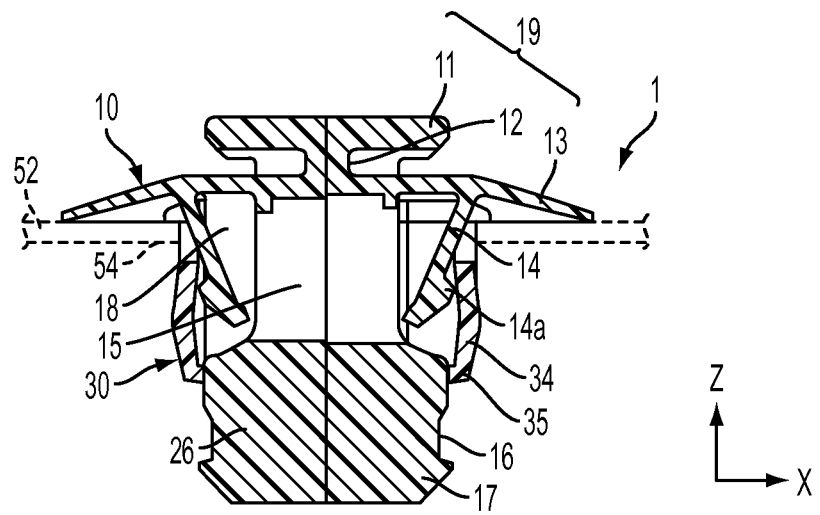
FIG. 20 is a cross-section along line C-C of FIG. 19 of the clip of FIG. 17.
Figure 21:
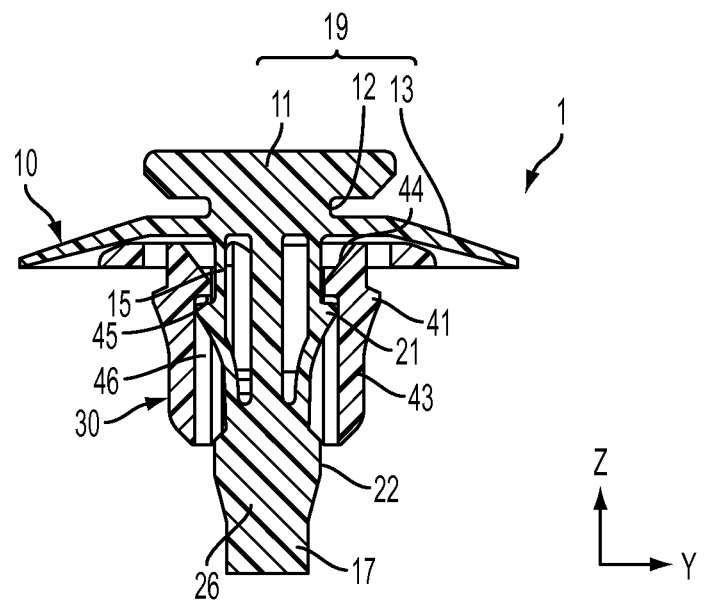
FIG. 21 is a cross-section along line D-D of FIG. 17 of the clip of FIG. 17.

FIG. 17 is a front elevation view of clip 1 with pin 10 and grommet 30 in a permanent fitted state. FIG. 18 is a side elevation view of the clip, and FIG. 19 is a bottom plan view. FIG. 20 is a cross-section along line C-C of FIG. 19 of clip 1. FIG. 21 is a cross-section along line D-D of FIG. 17 of clip 1.

From the temporary fitted state, if pin 10 is pushed into the bottom portion, the enlarged portion 14a lock pin 14 is pushed into the inside by means of the inner rim of attaching aperture 54 of base component 52. The tip portion of the enlarged portion 14a of lock pin 14 slips out of recessed portion 32 and entering the lock pin containing concave area 18 of the inside, pin 10 advances into the lower portion of aperture 36 of grommet 30, with the engaging end portion 17 being put forward first. Engaging end portion 17 of pin 10 exits at the bottom from aperture 36 of grommet 30. A pair of locking hooks 21 of pin 10 approach one another, being pressed to the inside by the inclined surfaces 44 of grommet 30, and advance to the lower portion.

Because enlarged portion 14a of lock pin 14 moves to the inside, the shank portion 39 of grommet 30 moves to the bottom through the attaching aperture 54 of base component 52 and the shank planar surface convex engaging portion 41 elastically deforms on the inside, passing through attaching aperture 54. If the upper surface of base component 52 abuts the lower surface of flange 31, shank planar surface convex engaging portion 41 returns to its original shape and abuts the lower side of base portion 52.

The lower surface of flange 31 abuts the upper surface of mounting component 52 and the motion of grommet 30 towards base component 52 is stopped. The shank planar surface convex engaging portion 41 of grommet 30 then returns to its shape before elastic deformation and abuts the lower surface of base component 52. Accordingly, base component 52 is squeezed and held between the shank planar surface convex engaging portion 41 and flange 31. Flange 31 is contained within plate portion 13 of pin 10, and the outer rim portion of plate 13 abuts the upper surface of base component 52.

In the permanent fitted state, the shank side surface convex engaging portion 35 of the lower end portion of shank side surface engaging portion 34 comes out of temporary fitting concave portion 16 of pin 10 and is positioned on both sides of the upper portion of shaft lower portion 26. Engaging hooks 21 of pin 10 enter the locking hook containing portion 46, and abutting step portion 45 of its upper end portion, pin 10 is prevented from slipping out. Locking hook 21 passes over step portion 45 and enters the locking hook containing portion 46, and by means of returning to its original position, there is a click sensation, so it is easy to know if pin 10 and grommet 30 have been permanently fitted.

FIG. 22 is a side elevation view showing the appearance when attached to base component 52 (panel), clip 1 being attached to a mounting component 51 (spoiler, trim or the like). Base component 51 has a rim portion 55 in which an aperture 53 or U-shaped groove extends in the x direction. When pin 10 and grommet 30 are in the temporary fitted state, mounting component 51 is held between pin flange 11 of the head portion 19 of pin 10 and plate portion 13; and following this, clip 1 is inserted in the attaching aperture 54 of base component 52, and mounting component 52 is squeezed and held between shank planar surface convex engaging portion 41 of grommet 30 and flange 31. If pin 10 is again pushed into grommet 30, it is possible to attach pin 10 and grommet 30 in a permanent fitted state.

In the first embodiment, a method was explained in which pin 10 and grommet 30 were attached to a mounting component 51 and then put in a permanent fitted state. In addition to this, pin 10 and grommet 30 may be attached to base component 52 in a temporary fitted state and then put in a permanent fitted state. Also, it is possible to attach grommet 30 to base component 52 without putting pin 10 and grommet 30 in a temporary fitted state, and, after attaching pin 10 to mounting component 51 to insert pin 10 in the aperture of grommet 30, putting pin 10 and grommet 30 in a permanent fitted state and attaching mounting component 51 to base component 52.

It is possible to release pin 10 and grommet 30 after putting pin 10 and grommet 30 of clip 1 in a permanent fitted state and mounting component 51 has been attached to base component 52. In releasing pin 10 and grommet 30, a tool such as a flat head screwdriver or the like is inserted between the plate portion 13 of pin 10 and base component 52 so as to pry open plate portion 13. When this is done, locking hooks 21 of pin 10 pass over step portion 45 of grommet 30, and move to the top of inclined surface portion 44. Shaft portion 20 of pin 10 moves to the top. Thus, lock pin 14 of pin 10 returns to the top of shank side surface portion 38 of grommet 30 and the enlarged portion 14a of lock pin 14 leaves from lock pin containing concave area 18, and contacting recessed portion 32, returns to a temporary fitted state. Also, pin 10 and grommet 30 can be released without using a tool, by pulling mounting component 51 in an upwards direction.

In completely releasing pin 10 and grommet 30 from the temporary fitted state, pin 10 is again pulled out and shank side surface convex engaging portion 35 of grommet 30 rides over engaging end portion 17 of pin 10, and it is possible to release pin 10 and grommet 30.

According to the first embodiment of the present invention, it is possible to obtain a clip which simply and securely attaches a mounting component such as a spoiler or molding or the like to a base component such as a car body panel or the like. Also, when the clip is held in a temporary fitted state, there is no unintentional permanent fitting of the two parts. In addition, it is easy to confirm that a permanent fitted state has been done, by means of a click sensation.

Figure 23:
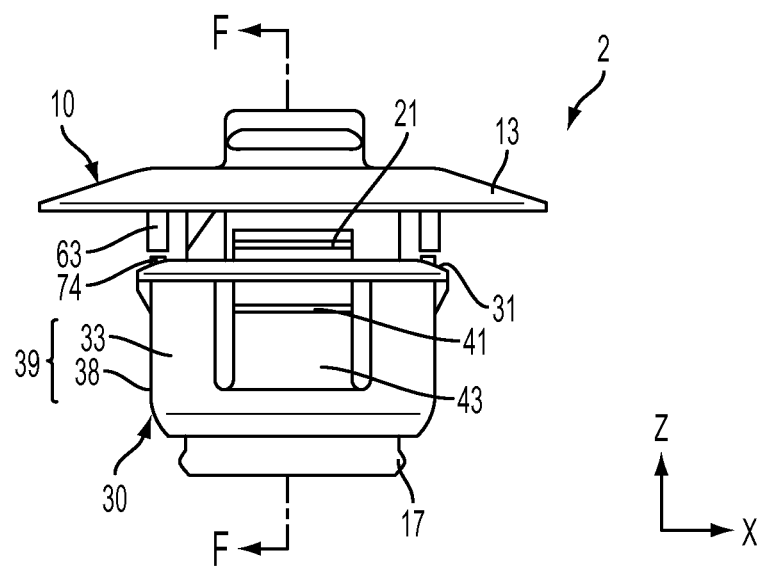
FIG. 23 is a front elevation view showing the appearance of the clip according to the second embodiment of the present invention, with the pin and grommet temporary fitted.
Figure 24:
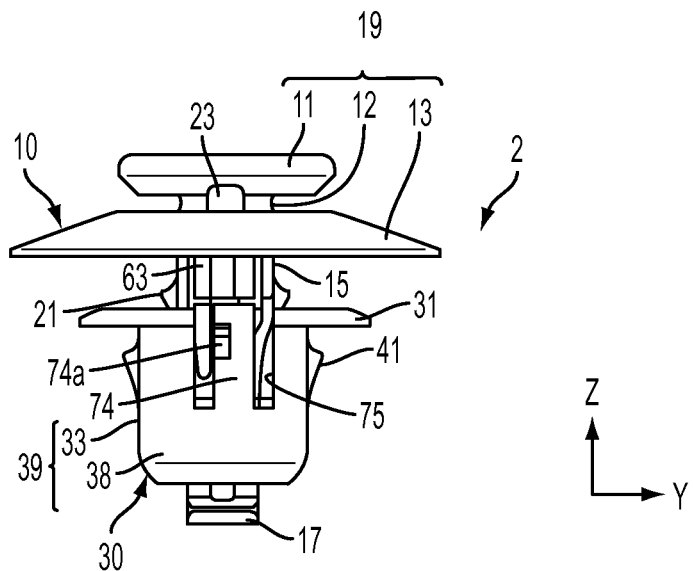
FIG. 24 is a side elevation view of the clip of FIG. 23.
Figure 25:
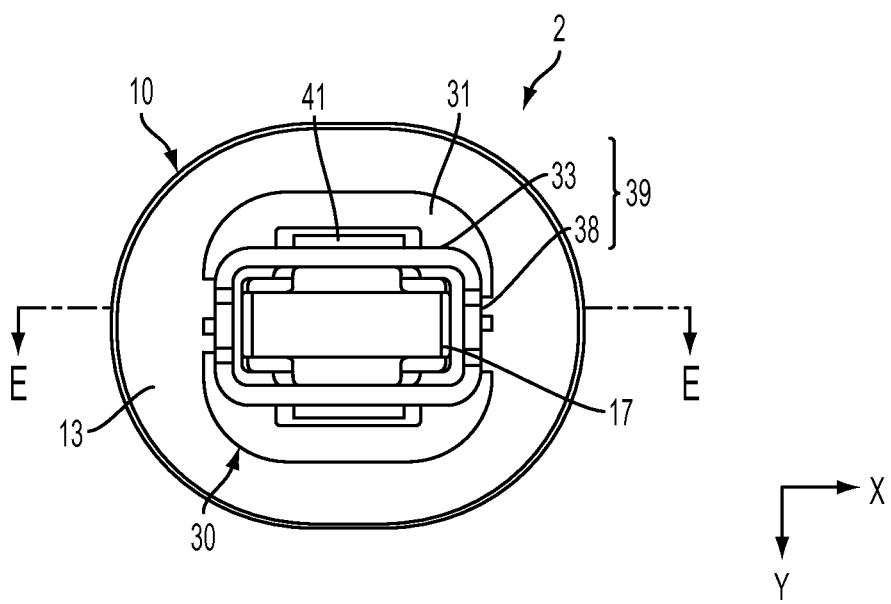
FIG. 25 is a bottom plan view of the clip of FIG. 23.
Figure 26:
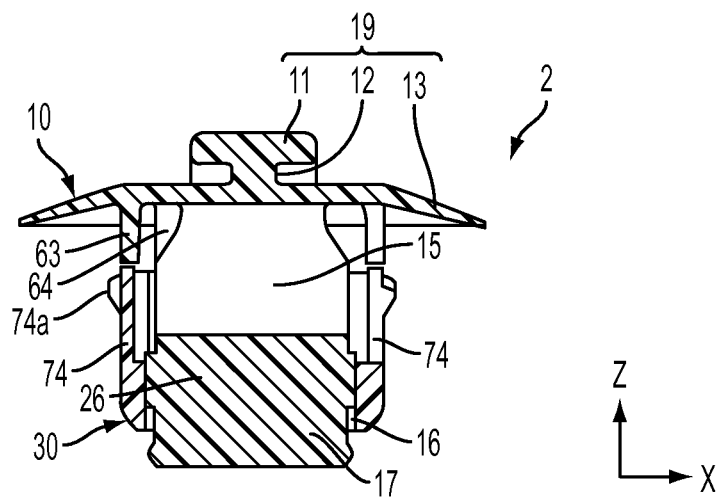
FIG. 26 is a cross-section along line E-E of FIG. 25 of the clip of FIG. 23.
Figure 27:
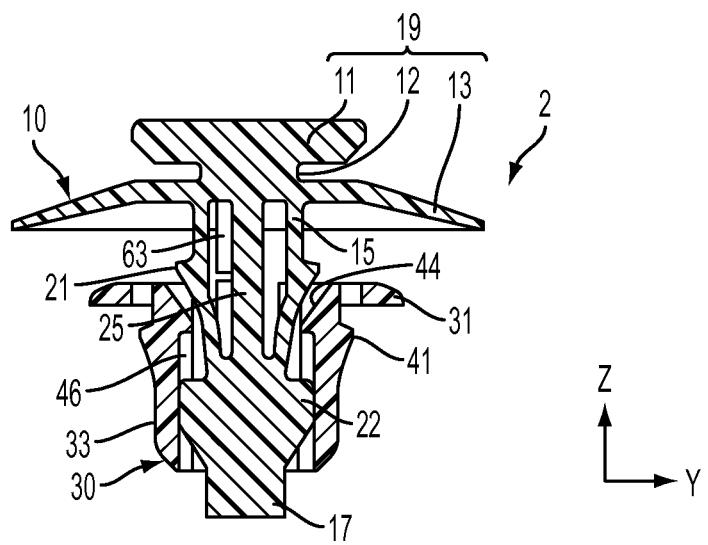
FIG. 27 is a cross-section along line F-F of FIG. 23 of the clip of FIG. 23.

FIG. 23 is a front elevation view of clip 2 according to the second embodiment of the present invention, in which the pin and the grommet are in a temporary fitted state. FIG. 24 is a side elevation view of the clip, and FIG. 25 is a bottom plan view. FIG. 26 is a cross-section along line E-E of FIG. 25 of the clip. FIG. 27 is a cross-section along line F-F of FIG. 23 of the clip.

As pertains to the clip of the second embodiment, we shall now explain those points which are different from the clip of the first embodiment. The reference numerals for clip 2 of the second embodiment are the same as for the clip of the first embodiment; the corresponding parts will also be shown by the same reference numerals. The parts that are different will be explained using different reference numerals.

In clip 1 of the first embodiment, lock pin 14 is the part of pin 10 which extends downwards from the head portion 19, and, by collapsing on the inside, it enters the inside of shank side surface portion 38 of grommet 30, and the temporary fitted state is released. In clip 2 of the second embodiment, lock pin 74 is the part of grommet 30 which extends upwards from shank side surface portion 38 of grommet 30. An enlarged portion 74a is formed as shown at a position near the upper end portion of lock pin 74. A slit 75 is provided on both sides of lock pin 74 in the y direction, so that lock pin 74 is capable of elastic deformation.

A short lock bar 63 extends downwards from head portion 19. In the temporary fitted state, lock bar 63 is near or abuts the upper end portion of lock pin 74. A lock pin containing concave area 64 is provided on the inside of lock bar 63 in the x direction, and lock pin 74 of grommet 30 collapses in so as to enter from the bottom portion.

In clip 1 of the first embodiment, the distance between the two surfaces in the y direction of shaft enlarged portion 22 of pin 10 being roughly equal to the distance between the lower end portions of the inclined surfaces 44 of grommet 30, shaft enlarged portion 22 does not push and widen inclined surface 44, and it impossible for it to enter into locking hook containing portion 46. In clip 2 of the second embodiment, the distance between the two surfaces in the y direction of shaft enlarged portion 22 of pin 10 is longer than distance between the lower end portion of the inclined surfaces 44 of grommet 30, and enlarged portion 22 pushes and widens inclined surface 44 elastically deforming these, and enters into locking hook containing portion 46. In the temporary fitted state, enlarged portion 22 of pin 10 is positioned inside locking hook containing portion 46. If pin 10 move upwards, pin 10 is prevented from slipping out because enlarged portion 22 abuts step portion 45 which is above locking hook containing portion 46.

From the temporary fitted state, if clip 2 is again inserted in attaching aperture 54 of base component 52, attaching aperture 54 abuts enlarged portion 74*a* on the top portion of lock pin 74 and stops. If pin 10 and grommet 30 are pushed into the attaching aperture 54 of base component 52, the rim of attaching aperture 54 pushes enlarged portion 74*a* from the outside, and the gap of the pair of enlarged portions 74*a* is smaller. The locking of the pair of lock pins 64 by lock bars 63 is released, and lock pin 74 enters into the lock pin containing concave area 64. It is possible for pin 10 to again move downward through aperture portion 36 through grommet 30.

Attaching aperture 54 of base component 52 pushes shank planar surface convex engaging portion 41 on the inside, and if shank planar surface convex engaging portion 41 is elastically deformed and rides over base component 52, it abuts the lower surface of base component 52. The lower surface of flange 31 abuts the upper surface of base component 52.

When locking hooks 21 of pin 10 are pushed by means of the inclined surfaces 44 of grommet 30, the gap becomes narrow, and passing over inclined surfaces 44, they enter into locking hook containing portion 46. Locking hooks 21 engage in step portion 45, preventing slipping, and a permanent fitted state results.

In the second embodiment of the invention, shank side surface engaging portion 34 of the lower portion of shank side surface 38, and slit 37, which are in the first embodiment, are not provided. The lower portion of shank side surface portion 38 is not fitted in pin 10 in the temporary fitted state or in the permanent fitted state. In the second embodiment, in the temporary fitted state, the enlarged portion 22 of pin 10 is prevented from slipping by the lower surface of inclined surfaces 44, and in the permanent fitted state, the locking hook 21 of pin 10 is prevented from slipping by the lower surface of inclined surface 44. An explanation pertaining to the other points will be omitted because they are the same as for clip 1 of the first embodiment. It is possible to obtain the same efficacy with clip 2 of the second embodiment as with clip 1 of the first embodiment.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A clip for attaching a mounting component to a base component, the clip comprising:
    a pin including a head portion for engaging the mounting component, and a shaft portion which is contiguous to the head portion, and a lock pin which is connected to the head portion at a top end of the lock pin and extends axially downward from the head portion to a free and radially flexible tip end of the lock pin;
    a grommet including a flange and a shank contiguous to the flange and partially defining an aperture operable to receive the pin in one of a temporary fitted position and a permanent fitted position, the grommet flange and shank partially defining a concave recess open in a first axial direction toward the flange and closed by a bottom portion in a second axial direction away from the flange; and
    wherein the temporary fitted position, the lock pin in an undeflected condition abuts the bottom portion of the concave recess in the grommet, maintaining the temporary fitted position, and
    wherein in the permanent fitted position, the lock pin in a radially inward deflected condition is contained on the inside of the shank portion of the grommet.

2. A clip according to claim 1 in which the lock pin includes an enlarged tip portion, and, when the pin is moved from the temporary fitted position to the permanent fitted position, then the enlarged tip portion of the lock pin is pushed to the inside by an inner rim of an attaching aperture, and the abutment of the lock pin with the bottom portion of the concave recess in the grommet is released.

3. A clip according to claim 1 in which the pin partially defines a lock pin concave containing area, and, when the lock pin is bent radially inward, then the lock pin is partly contained in the lock pin concave containing area.

4. A clip according to claim 1 in which the pin includes a temporary fitted concave portion in the shaft portion, and the grommet includes a shank side surface convex engaging portion in the shank portion, and when in the temporary fitted position, then the shank side surface convex engaging portion engages in the temporary fitted concave portion.

5. A clip according to claim 1 in which the pin includes a locking hook in the shaft portion, and the grommet includes an inclined surface in the shank portion and a locking hook containing portion below the inclined surface; and, when in the permanent fitted position, the locking hook passes over the inclined surface and is positioned in the locking hook containing portion.

6. A clip for attaching a mounting component to a base component, and the clip comprises:
    a pin including a head portion for holding the mounting component, a shaft portion which is contiguous to the head portion, and a lock bar which are contiguous to the head portion;
    a grommet including a flange, a shank portion which is contiguous to the flange, a lock pin formed in the shank portion, and partially defining an aperture portion operable to receive the pin in one of a temporary fitted position and a permanent fitted position; and
    wherein in the temporary fitted position, the lock pin of the grommet abut the lock bar formed in the pin, maintaining the temporary fitted position; and in the permanent fitted position, the lock pin collapses to the inside and is contained on the inside of the lock bar of the pin.

7. A clip according to claim 6, wherein the lock pin includes an enlarged tip portion, and when the enlarged tip portion is pushed to the inside, then the abutment of the lock pin with the lock bar is released.

8. A clip according to claim 6, wherein the pin partially defines a lock pin containing concave area, and when the lock pin is bent inward then the lock pin is partly contained in the lock pin containing concave area.

9. A clip according to claim 6, wherein the pin shaft includes an enlarged portion, and the grommet shank portion includes an inclined surface and a locking hook containing portion below the inclined surface; and when in the temporary fitted position, the enlarged portion of the pin passes over the inclined surface and is located in the locking hook containing portion.

10. A clip as set forth in claim 9 in which the pin includes a locking hook, and, when in the permanent fitted position, the locking hook passes over the inclined surface and is positioned in the locking hook containing portion.

* * * * *